May 4, 1926.
R. C. BENNER
1,583,649
ACTIVE MATERIAL SUPPORT FOR STORAGE CELLS
Filed Sept. 8, 1922
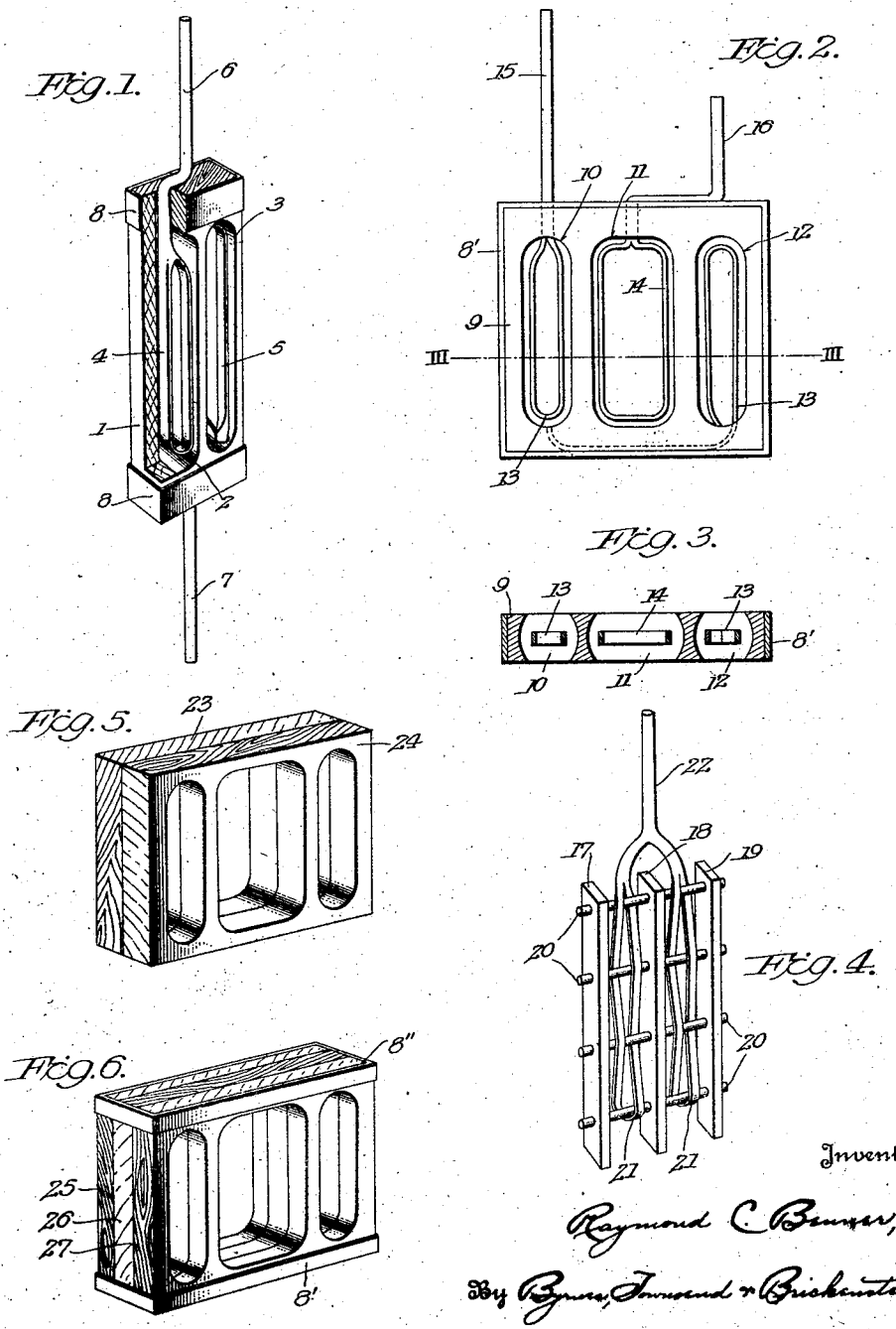
Inventor:
Raymond C. Benner,
By Byrnes, Townsend & Brickenstein,
Attorneys Patented May 4, 1926.

1,583,649

UNITED STATES PATENT OFFICE.

RAYMOND C. BENNER, OF BAYSIDE, NEW YORK, ASSIGNOR TO THE PREST-O-LITE COMPANY, INC., OF NEW YORK, N. Y., A CORPORATION OF NEW YORK.

ACTIVE-MATERIAL SUPPORT FOR STORAGE CELLS.

Application filed September 8, 1922. Serial No. 586,938.

*To all whom it may concern:*

Be it known that I, RAYMOND C. BENNER, a citizen of the United States, residing at Bayside, in the county of Queens and State of New York, have invented certain new and useful Improvements in Active-Material Supports for Storage Cells, of which the following is a specification.

This invention relates to supports for the active material of storage cells. The principal object of the invention is to provide improved non-conductive supports of light weight, having simple and effective means for retaining the active material and conducting the electric current. When wood is used in the construction of the supports special means is also provided for preventing splitting and distortion.

The invention will be described in connection with the accompanying drawings, in which—

Fig. 1 is a perspective view, partly broken away, showing a preferred form of the invention;

Fig. 2 is a side elevation of a modified form;

Fig. 3 is a horizontal section on line III—III, Fig. 2;

Fig. 4 is a perspective view of a further modification; and

Figs. 5 and 6 are perspective views of a support built up with wood strips having the grain oppositely directed.

Referring to Fig. 1, reference numeral 1 denotes a wooden block provided with openings or slots 2 and 3 which extend completely through the block. Conductive means 4 and 5, preferably lead strips, lie within the slots 2 and 3, respectively. Terminals 6 and 7 are connected to the strips and may conveniently be formed integrally therewith.

Reinforcing means, such as bands of celluloid 8, are fitted about the ends of block 1. I have found that these bands largely diminish the tendency toward splitting and distortion, both during the tamping of the active material and the service life of the electrode. Wooden supports so reinforced are well adapted for general use. They are particularly desirable where a cheap construction of light weight is required. If hard rubber or celluloid is the material of the support the bands 8 need not be supplied.

In the forms of the invention shown in Figs. 2 and 3, a non-conductive plate 9 is provided with openings 10, 11, and 12, extending therethrough. The opening 11 is preferably larger than openings 10 and 12 and receives active material of different polarity than that to be placed in these latter. The openings are preferably double concave in cross section, so as to retain the active material blocks in a positive manner. Lead strips 13 and 14 are provided to carry the current to terminals 15 and 16, respectively. A celluloid reinforcing band 8' is secured around the plate 9, for the purpose previously described.

Figs. 1 and 2 show unitary supports, but if desired a composite frame may be substituted, or the supports may be laminated in a manner to be described.

The support shown in Fig. 4 comprises bars 17, 18, and 19, of wood or the like, connected by rods 20, each of which passes through alined perforations in the bars. The rods preferably are rather loosely fitted in the bars so that these latter may be shifted by the expansion of the active material without injury to the structure. Lead strips 21 are interlaced with the rods and are connected to a terminal 22. Either positive or negative active material may be packed upon the support.

The grain of the wood forming bars 17, 18, and 19, may be oppositely directed so that stress due to warping tendency will be in large part compensated.

Figs. 5 and 6 show the use of wood strips to build up the support. In Fig. 5, strips 23 and 24, with the grain running at right angles, are secured together in any suitable way. Celluloid cement may be used as the securing means with good results. In Fig. 6 the construction is similar, but three strips 25, 26 and 27 are used, the grain of the intermediate strip running oppositely to that of the other two.

I have found that warping is substantially prevented under most conditions by the composite construction described. Reinforcing bands 8'' may be supplied as an added precaution, if desired, as shown in Fig. 6.

I am aware that certain types of non-conductive supports for active material have heretofore been proposed. My invention is distinguished from such types by the exposure of the active material on both sides of the support, and by reinforcing means of the general nature described. The distinguishing features of my invention are not dependent upon the constructions detailed herein, and various modifications of these constructions may be made within the scope of the appended claims.

I claim:—

1. An electrode comprising a non-conductive support provided with openings extending completely therethrough, conductive means positioned in the openings out of contact with the side walls thereof and having an area insufficient substantially to obstruct the same, and active material in contact with said conductive means and exposed on opposite sides of the support.

2. An active material support comprising a member formed from non-conductive material subject to splitting or warping, and binding means about said member to prevent such action.

3. An active material support comprising a wooden block, and bands secured about marginal portions of said block to prevent splitting or warping.

4. An active material support comprising wooden members secured together with their grain running in different directions, whereby warping is substantially prevented.

5. The invention according to claim 4, in which reinforcing bands are provided about the wooden members.

6. An electrode comprising a wooden block having elongated openings extending therethrough, active material in said openings and exposed on both faces of said block, and bands engaging said block to prevent warping or splitting of the same.

In testimony whereof, I affix my signature.

RAYMOND C. BENNER.